United States Patent
Chan et al.

(10) Patent No.: US 6,827,360 B2
(45) Date of Patent: Dec. 7, 2004

(54) ONE-PIECE TRAILING ARM SECTION

(75) Inventors: David J. Chan, Hawarden (GB); Martin L. Peaker, Chester (GB)

(73) Assignee: ArvinMeritor Technology, LLC, Troy, MI (US)

(*) Notice: Subject to any disclaimer, the term of this patent is extended or adjusted under 35 U.S.C. 154(b) by 108 days.

(21) Appl. No.: 10/279,162

(22) Filed: Oct. 24, 2002

(65) Prior Publication Data
US 2004/0080132 A1 Apr. 29, 2004

(51) Int. Cl.[7] ................................................. B60G 9/02
(52) U.S. Cl. ..................... 280/124.116; 280/124.132; 29/897.2
(58) Field of Search .................. 280/124.116, 124.128, 280/124.11, 124.13, 124.132, 124.1; 29/897.2; 267/228, 248, 256

(56) References Cited

U.S. PATENT DOCUMENTS

| | | |
|---|---|---|
| 1,325,832 A | 12/1919 | Coburn |
| 2,011,239 A | 8/1935 | Christmas |
| 2,163,981 A | 6/1939 | Lawrence |
| 2,606,036 A | 8/1952 | Collender |
| 2,635,896 A | 4/1953 | Tantlinger |
| 2,877,010 A | 3/1959 | Gouirand |
| 2,913,252 A | 11/1959 | Norrie |
| 2,993,707 A | 7/1961 | Vaugoyeau |
| 3,140,880 A | 7/1964 | Masser |
| 3,434,707 A | 3/1969 | Raidel |
| 3,547,215 A | 12/1970 | Bird |
| 3,594,017 A | 7/1971 | Grosseau |
| 3,630,541 A | 12/1971 | Carlson |
| 3,707,298 A | 12/1972 | Henry |
| 3,771,812 A | 11/1973 | Pierce |
| 3,785,673 A | 1/1974 | Harbers |
| 3,961,826 A | 6/1976 | Sweet |
| 4,027,898 A | 6/1977 | Steen |
| 4,061,362 A | 12/1977 | Bufler |
| 4,065,153 A | 12/1977 | Pringle |
| 4,166,640 A | 9/1979 | VanDenberg |
| 4,174,855 A | 11/1979 | Vandenberg |
| 4,293,145 A | 10/1981 | Taylor |
| 4,310,171 A | 1/1982 | Merkle |
| 4,352,509 A | 10/1982 | Paton |

(List continued on next page.)

FOREIGN PATENT DOCUMENTS

| | | |
|---|---|---|
| DE | 1933469 | 7/1969 |
| DE | 3119022 A1 | 12/1982 |
| EP | 0458665 A1 | 11/1991 |
| EP | 0600198 B1 | 6/1994 |
| WO | WO 98/17487 | 4/1998 |
| WO | WO 00/01548 | 1/2000 |

OTHER PUBLICATIONS

Daytonair Truckmaster Suspension Brochure (Prior Art).
Eaton Axle and Brake Brochure and Information—1989.
Fruehauf Cargo Care and Pro Par Suspension Brochure (Prior Art).
GMC Astro–Air Suspension Brochure and Information (Prior Art).
HT Series Suspension Brochure (Prior Art).
Hutchens & Sons Suspensions Brochure (Prior Art).
Rockwell International ROR Bogie Assemblies Brochure.

Primary Examiner—Peter C. English
(74) Attorney, Agent, or Firm—Carlson, Gaskey & Olds

(57) ABSTRACT

A trailing arm suspension is formed as a one-piece stamped body having a central web and two laterally spaced side walls. A wrap is to be secured to an axle and received in a recess between the walls. The integrated wrap has radially outwardly extending ledges which are welded to the walls, and which provide support surfaces along the axle axis. In further features, closing plates are mounted to the spaced side walls.

15 Claims, 3 Drawing Sheets

U.S. PATENT DOCUMENTS

| | | | |
|---|---|---|---|
| 4,371,190 A | 2/1983 | Vandenberg | |
| 4,415,179 A | 11/1983 | Marinelli | |
| 4,427,213 A | 1/1984 | Raidel | |
| 4,494,771 A | 1/1985 | Raidel | |
| 4,504,080 A | 3/1985 | Vandenberg | |
| 4,529,224 A | 7/1985 | Raidel | |
| 4,537,420 A | 8/1985 | Ito | |
| 4,541,643 A | 9/1985 | Pavincic | |
| 4,566,719 A | 1/1986 | Vandenberg | |
| 4,691,937 A | 9/1987 | Raidel | |
| 4,693,486 A | 9/1987 | Pierce | |
| 4,722,549 A | 2/1988 | Raidel | |
| 4,763,923 A | 8/1988 | Raidel | |
| 4,878,691 A | 11/1989 | Cooper | |
| 4,902,035 A | 2/1990 | Raidel | |
| 4,943,081 A | 7/1990 | Golpe | |
| 4,991,868 A | 2/1991 | Vandenberg | |
| 5,002,305 A | 3/1991 | Raidel | |
| 5,029,885 A | 7/1991 | Steiner | |
| 5,037,126 A | 8/1991 | Gottschalk | |
| 5,058,916 A | 10/1991 | Hicks | |
| 5,112,078 A | 5/1992 | Galazin | |
| 5,127,668 A | 7/1992 | Raidel | |
| 5,171,036 A | 12/1992 | Ross | |
| 5,203,585 A | 4/1993 | Pierce | |
| 5,366,237 A | 11/1994 | Dilling | |
| 5,375,871 A * | 12/1994 | Mitchell et al. | 280/124.116 |
| 5,403,031 A | 4/1995 | Gottschalk | |
| 5,443,280 A | 8/1995 | Kawaguchi | |
| 5,464,245 A | 11/1995 | Vogler | |
| 5,639,110 A * | 6/1997 | Pierce et al. | 280/124.116 |
| 5,690,353 A | 11/1997 | Vandenberg | |
| 5,720,489 A | 2/1998 | Pierce | |
| 5,785,345 A | 7/1998 | Barlas | |
| 5,810,377 A | 9/1998 | Keeler | |
| 5,887,881 A | 3/1999 | Hatch | |
| 5,921,570 A | 7/1999 | Lie | |
| 5,938,221 A | 8/1999 | Wilson | |
| 5,944,339 A | 8/1999 | McKenzie | |
| 5,950,971 A | 9/1999 | Koumbis | |
| 5,954,351 A | 9/1999 | Koschinat | |
| 5,988,672 A | 11/1999 | VanDenberg | |
| 5,996,981 A | 12/1999 | Dilling | |
| 6,039,336 A * | 3/2000 | Frey | 280/124.128 |
| 6,062,578 A | 5/2000 | Richardson | |
| 6,073,946 A | 6/2000 | Richardson | |
| 6,123,349 A | 9/2000 | Depue | |
| 6,209,895 B1 * | 4/2001 | Mueller et al. | 280/124.116 |
| 6,264,231 B1 | 7/2001 | Scully | |
| 6,425,593 B2 | 7/2002 | Fabris | |
| 6,508,482 B2 | 1/2003 | Pierce | |
| 2003/0146592 A1 * | 8/2003 | Chalin et al. | 280/124.116 |
| 2004/0051268 A1 * | 3/2004 | Chan et al. | 280/124.1 |

* cited by examiner

ONE-PIECE TRAILING ARM SECTION

BACKGROUND OF THE INVENTION

This invention relates to a trailing arm suspension for securing an axle on a heavy vehicle.

Trailing arm suspensions are known, and have a recess to receive an axle and may have an intermediate surrounding sleeve. The sleeve is mounted within the recess, and then secured to the axle. Typically, trailing arm suspensions have utilized at least two parts which must be welded together to form the trailing arm. Moreover, the sleeves which have been utilized have typically been cylindrical reinforcement sleeves. Thus, the weld between the sleeves and the trailing arm suspension has typically been a weld along the partial circumference of the recess. It would be desirable to provide a simplified trailing arm suspension. Further, it would be desirable to provide a connection between the trailing arm and the sleeve which is reliably strong.

SUMMARY OF THE INVENTION

In the disclosed embodiment of this invention, a trailing arm suspension is formed of a one-piece stamping which is folded into a desired shape. This one-piece stamping has a recess which extends over approximately 270° to receive a wrap assembly. The wrap assembly includes ledges which extend radially outwardly of the portion of the wrap assembly secured to the axle. These ledges provide weld locations for connection of the arm to the wrap, such that there is structure on the wrap supporting the arm in a direction generally along the axis of the axle.

In preferred embodiments of this invention, closing plates as well as a pivot bush are also secured to the one-piece body.

These and other features of the present invention can be best understood from the following specification and drawings, the following of which is a brief description.

DETAILED DESCRIPTION OF THE PREFERRED EMBODIMENT

Figure 1:
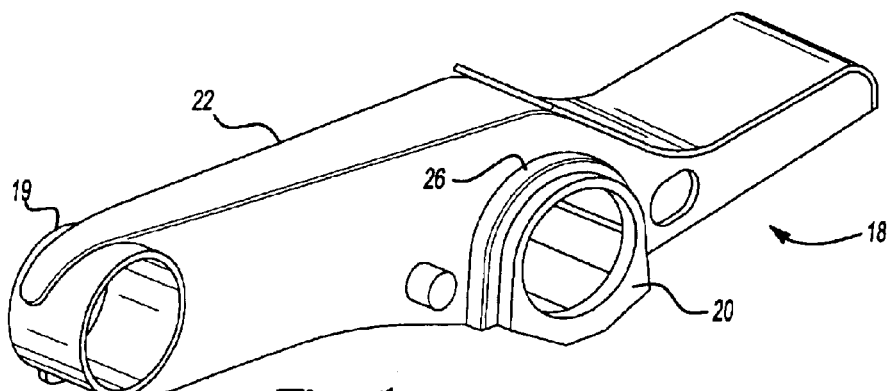
FIG. 1 is a perspective view of an inventive trailing arm suspension.

A suspension 18 includes a pivot bush tube 19 which will pivotally attach the trailing arm suspension to a vehicle frame. A wrap assembly 20 surrounds an axle, and will be welded to the axle. The arm body 22 includes a recess 24 which is welded to ledges 26 extending radially outwardly of the wrap 20.

Figure 2:
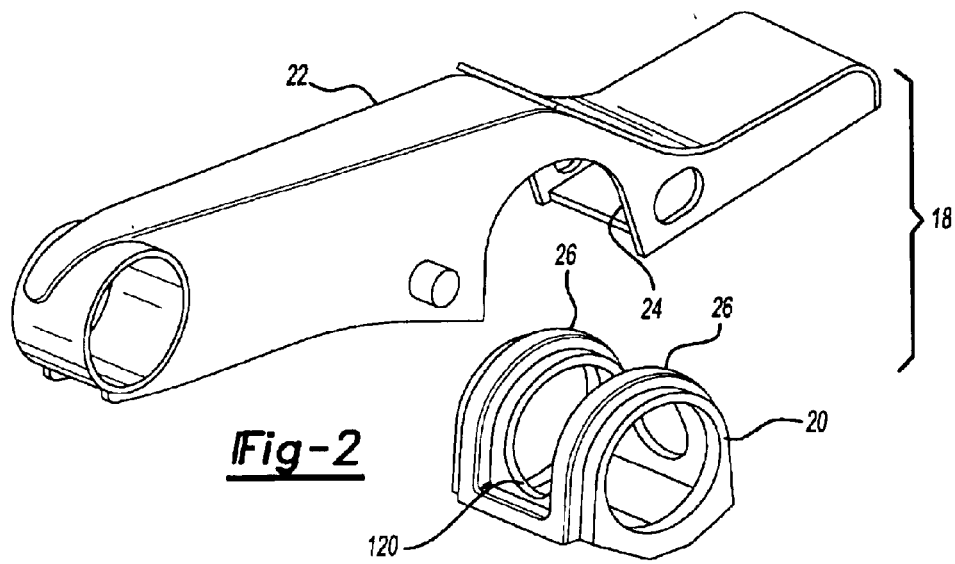
FIG. 2 is a partially exploded view of the FIG. 1 suspension.

As shown in FIG. 2, the wrap assembly 20 is initially formed separate of the recess 24. The outwardly extending ledges 26 are aligned with the recess 24, as will be better explained below.

Figure 3:
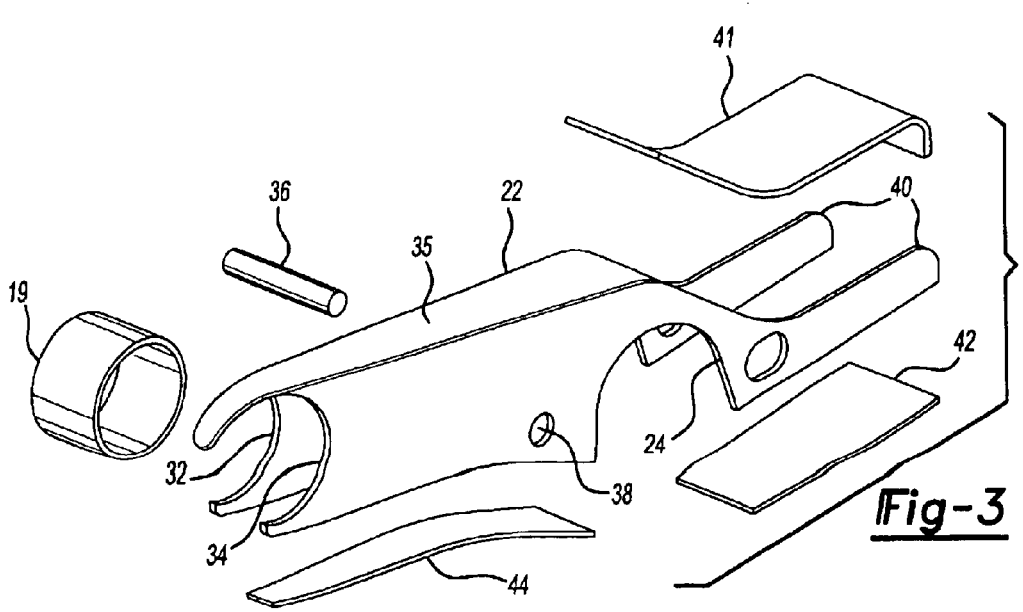
FIG. 3 is an exploded view of a portion of the FIG. 1 suspension.

As shown in FIG. 3, the arm body 22 is formed as a one-piece metal stamping. Side plates 32 and 34 extend downwardly from a top connecting central web 35. The pivot bush 19 is received in an opening near the front of the side plates 32 and 34. A shock tube 36 extends through holes 38 in side plates 32 and 34.

Rear spaced side walls 40 extend rearwardly of the recess 24. A top closing plate 41 is secured to the side walls 40 and a rear bottom closing plate 42 is also secured to the side walls 40. A forward bottom closing plate 44 is secured to the side plates 32 and 34.

As perhaps best shown in FIG. 2, the ledges 26 extend outwardly of the remainder of the wrap body. An axle is received within the wrap assembly 20, as explained above. The wrap assembly 20 would be welded to the axle, preferably via the puddle weld window 120.

Figure 4:
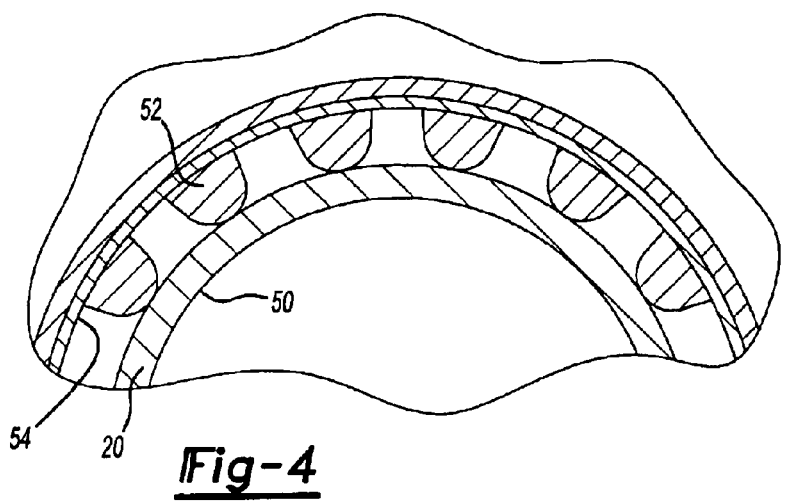
FIG. 4 is a cross-sectional view showing the arrangement of certain parts in the inventive suspension.

One wrap assembly 20 is illustrated in FIG. 4 having inner periphery 50 which will receive the axle. The arm inner surface 54 is secured to a plurality of spaced castellations 52 on the wrap assembly. The castellations 52 are welded to the inner surface 54 of the arm. This connection will allow the joint some compliance while still ensuring a durable joint.

Figure 5A:
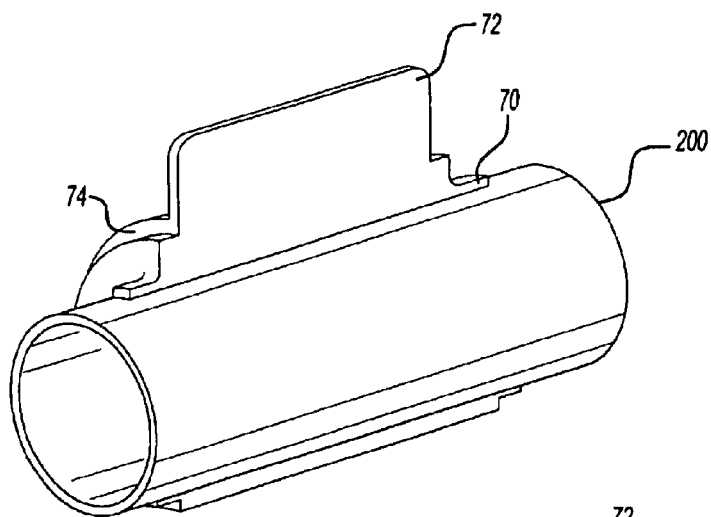
FIG. 5A shows one wrap embodiment.
Figure 5B:
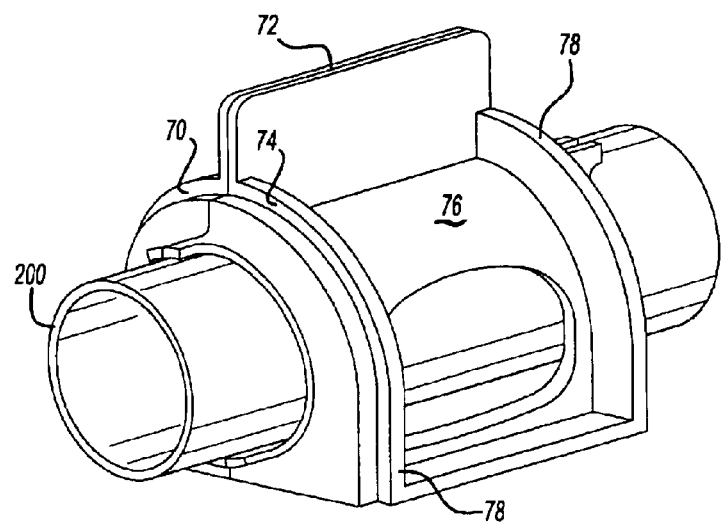
FIG. 5B shows an assembly of the FIG. 5A wrap.
Figure 5C:
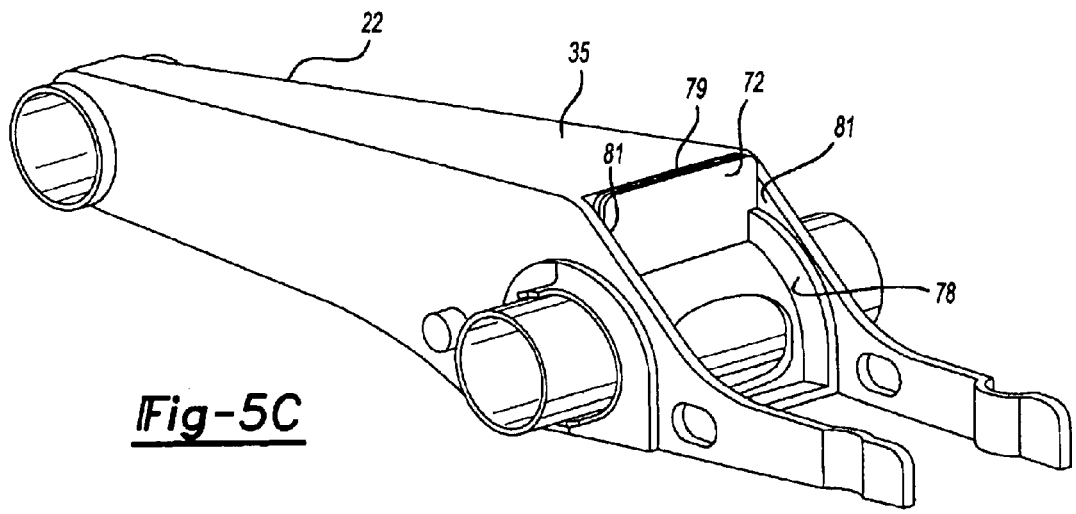
FIG. 5C shows the assembly of the trailing arm.

FIGS. 5A–C show a distinct wrap embodiment having wrap halves 70 and 76. The ridges are formed by ledge halves 74 and 78 on the two wrap halves (see FIG. 5B). A tongue 72 extends radially outwardly, and generally perpendicularly to the ridges formed by ledge halves 74 and 78. The wrap halves 70 and 76 are shown secured to axle 200. Typically, a weld joint connects the wrap halves to the axle.

As can be seen in FIG. 5C, the tongue 72 fits snugly into the space formed by the inner wall 79 of the central web 35 and the inner surfaces 81 of the two side plates. In this fashion, the tongue 72 thus provides additional support. At least one edge of the tongue 72 is welded to the inner periphery of the arm.

Figure 6:
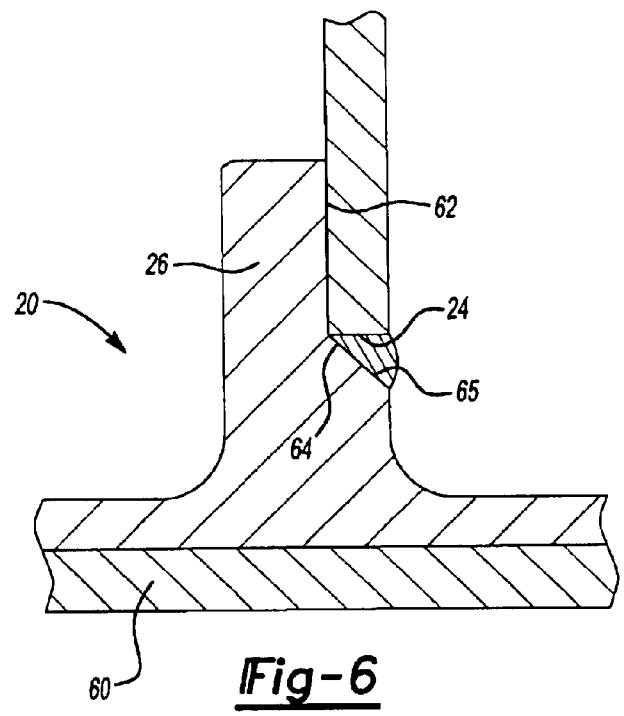
FIG. 6 shows the connection of the wrap to the arm.

One connection embodiment shown in FIG. 6 connects the arm to the wrap by a ledge with surfaces 62 and 64, and in turn, the wrap mounts the trailing arm body 22. This provides space at 65 to receive a butt weld to secure the two together. As can be appreciated, the surface 62 provides support along the axis of movement of the axle for the arm body portion which forms the recess 24. As can be appreciated, there would be a second similar connecting surface spaced axially from this surface on the other side of the arm. Notably, as shown in FIG. 6, the trailing arm body 22 extends axially outwardly of the ledge 26. That is, the other ledge 26 and the other wall of the trailing arm body 22 would be to the left of the FIG. 6 view.

Figure 7:
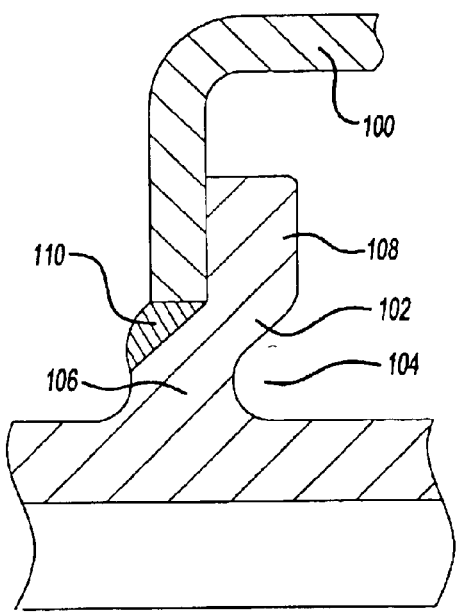
FIG. 7 shows an alternative connection of the wrap to the arm.

An alternative connection embodiment is shown in FIG. 7. In this embodiment, the arm 100 fits onto the ledge 102. There is a recess 104 between the ledge body such that the ledge extends axially inwardly through an angled portion 106 to the portion 108 which receives the arm. This recess allows some flexibility in the connection. Again, a weld recess 110 is provided.

The preferred embodiments of the invention have been disclosed. However, a worker of ordinary skill in this art would recognize that certain modifications would come within the scope of this invention. For that reason the following claims should be studied to determine the true scope and content of this invention.

What is claimed is:

1. A trailing arm suspension for securing an axle to a vehicle frame comprising:

a trailing arm body having spaced side a pivot connection at one axial end, and a recess formed at an intermediate portion along said trailing arm body; and a wrap assembly to be welded to said spaced side plates, said wrap assembly having an inner peripheral surface to receive an axle, said wrap assembly having radially outwardly extending ledges extending circumferentially about said axle said spaced side plates of said trailing arm body being welded to said radially outwardly extending ledges at weld joints.

2. The trailing arm suspension as set forth in claim 1, wherein there are a pair of axially spaced ones of said radially outwardly extending ledges.

3. The trailing arm suspension as set forth in claim 1, wherein said wrap assembly is formed of two portions.

4. The trailing arm suspension as set forth in claim 1, wherein circumferentially spaced castellations are positioned between said wrap assembly and said spaced side plates.

5. The trailing arm suspension as set forth in claim 1, wherein the weld joints between said spaced side plates and said radially outwardly extending ledges includes said radially outwardly extending ledges having a first portions, and second portions extending from said first portions and with said trailing arm body received against said first portions, and radially outwardly of said second portions.

6. The trailing arm suspension as set forth in claim 1, wherein closing plates close open spaces between said spaced side plates of said trailing arm body.

7. A trailing arm suspension for securing an axle to a vehicle frame comprising:

a trailing arm body having spaced side plates, a pivot connection at one axial end, and a recess formed at an intermediate portion along said trailing arm body;

a wrap assembly to be welded to said spaced side plates, said wrap assembly having an inner peripheral surface to receive an axle, said wrap assembly having radially outwardly extending ledges, said spaced side plates of said trailing arm body being welded to said radially outwardly extending ledges at weld joints;

said wrap assembly being formed of two wrap portions; and one of said two wrap portions having an outwardly extending tongue formed to extend axially between said radially outwardly extending ledges.

8. The trailing arm suspension as set forth in claim 7, wherein said outwardly extending tongue is welded to an inner peripheral surface of said trailing arm body.

9. The trailing arm suspension as set forth in claim 8, wherein said outwardly extending tongue fills a space between said spaced side plates and a central web which connects said spaced side plates.

10. A trailing arm suspension for securing an axle to a vehicle frame comprising:

a trailing arm body having spaced side plates, a pivot connection at one axial end, and a recess formed at an intermediate portion along said trailing arm body;

a wrap assembly to be welded to said spaced side plates, said wrap assembly having an inner peripheral surface to receive an axle, said wrap assembly having radially outwardly extending ledges, said spaced side plates of said trailing arm body being welded to said radially outwardly extending ledges at weld joints;

the weld joints between said spaced side plates and said radially outwardly extending ledges including said radially outwardly extending ledges having first portions and second portions extending axially outwardly from said first and with said spaced side plates received against said portions, and radially outwardly of said second portions; and spaces being provided radially between lower portions of said spaced side plates and said second portions and spaces receiving the weld joints.

11. A trailing arm suspension for securing an axle to a vehicle frame comprising:

a trailing arm body having spaced side plates, a pivot connection at one axial end, and a recess formed at an intermediate portion along said trailing arm body;

a wrap assembly to be welded to said spaced side plates, said wrap assembly having an inner peripheral surface to receive an axle, said wrap assembly having radially outwardly extending ledges, said spaced side plates of said trailing arm body being welded to said radially outwardly extending ledges at weld joints;

the weld joints between said spaced side plates and said radially outwardly extending ledges including said radially outwardly extending ledges having first portions and second portions extending axially outwardly from said first portions, and with said spaced side plates received against said first portions and radially outwardly of said second portions; and said first portions being formed by angled portions extending from said second portions with a recess being formed radially between said first portions and an outer peripheral surface of said wrap assembly.

12. A trailing arm suspension comprising:

a body having a central web at a forward end;

two laterally spaced side plates formed at opposed sides of said central web, with said laterally spaced side plates having forward side plate portions connected to said central web at a first end, and rear side plate portions extending beyond said central web, said central web extending to be aligned with a recess formed in each of said laterally spaced side plates; and a first closing plate secured to a first end of said rear side plate portions, and a second closing plate secured to a second end of said forward side plate portions.

13. The trailing arm suspension as set forth in claim 12, wherein said recesses extend for at least 180° about a central axis.

14. The trailing arm suspension as set forth in claim 12, wherein each of said recesses is secured to a ridge on an outer periphery of a wrap which is to receive an axle.

15. The trailing arm suspension as set forth in claim 12, wherein a third closing plate is secured to a second end of said rear side plate portions.

* * * * *

UNITED STATES PATENT AND TRADEMARK OFFICE
CERTIFICATE OF CORRECTION

PATENT NO. : 6,827,360 B2
DATED : December 7, 2004
INVENTOR(S) : Chan et al.

It is certified that error appears in the above-identified patent and that said Letters Patent is hereby corrected as shown below:

Column 3,
Line 4, insert -- plates -- after "side" and before the second occurrence of "a"
Line 26, delete -- a --.

Column 4,
Line 11, insert -- portions -- after "first" and before "and".
Line 12, insert -- first -- after "said" and before "portions".
Line 15, the second occurrence of "and" should read as -- , said --.

Signed and Sealed this

First Day of March, 2005

JON W. DUDAS
*Director of the United States Patent and Trademark Office*